US012390875B2

(12) United States Patent
Manjon Fernandez et al.

(10) Patent No.: US 12,390,875 B2
(45) Date of Patent: Aug. 19, 2025

(54) METHOD FOR THE MANUFACTURE OF AN ASSEMBLY BY SUBMERGED ARC WELDING (SAW)

(71) Applicant: ArcelorMittal, Luxembourg (LU)

(72) Inventors: Alvaro Manjon Fernandez, Oviedo Asturias (ES); Marcos Perez Rodriguez, Cangas del Narcea Asturias (ES); Roberto Suarez Sanchez, Aviles Asturias (ES); Sivasambu Bohm, Godmanchester (GB)

(73) Assignee: ArcelorMittal, Luxembourg (LU)

( * ) Notice: Subject to any disclaimer, the term of this patent is extended or adjusted under 35 U.S.C. 154(b) by 722 days.

(21) Appl. No.: 17/603,463

(22) PCT Filed: Apr. 16, 2020

(86) PCT No.: PCT/IB2020/053584
§ 371 (c)(1),
(2) Date: Oct. 13, 2021

(87) PCT Pub. No.: WO2020/212887
PCT Pub. Date: Oct. 22, 2020

(65) Prior Publication Data
US 2022/0176485 A1  Jun. 9, 2022

(30) Foreign Application Priority Data
Apr. 17, 2019  (WO) ................. PCT/IB2019/053176

(51) Int. Cl.
*B23K 9/18* (2006.01)
*B23K 9/02* (2006.01)
*B23K 9/23* (2006.01)
*B23K 9/235* (2006.01)
*B23K 35/36* (2006.01)
*B23K 101/34* (2006.01)
*B23K 103/04* (2006.01)
*B23K 103/10* (2006.01)
*C23C 28/00* (2006.01)

(52) U.S. Cl.
CPC ................. *B23K 9/18* (2013.01); *B23K 9/02* (2013.01); *B23K 9/232* (2013.01); *B23K 9/235* (2013.01); *B23K 35/3608* (2013.01); *C23C 28/321* (2013.01); *C23C 28/3455* (2013.01); *B23K 2101/35* (2018.08); *B23K 2103/04* (2018.08); *B23K 2103/10* (2018.08)

(58) Field of Classification Search
None
See application file for complete search history.

(56) References Cited

U.S. PATENT DOCUMENTS

| | | | |
|---|---|---|---|
| 3,393,102 A | 7/1968 | Carrol et al. | |
| 3,624,345 A * | 11/1971 | Armstrong | B23K 9/124 |
| | | | 219/137 R |
| 5,183,991 A | 2/1993 | Arai et al. | |
| 5,236,517 A | 8/1993 | Findlan | |
| 5,368,947 A | 11/1994 | Denney et al. | |
| 5,804,792 A * | 9/1998 | Paskell | B23K 35/3608 |
| | | | 148/26 |
| 6,312,812 B1 | 11/2001 | Hauser et al. | |
| 6,664,508 B1 * | 12/2003 | Johnson | B23K 35/362 |
| | | | 219/136 |
| 6,815,635 B2 * | 11/2004 | Briand | B23K 26/123 |
| | | | 219/121.64 |
| 2002/0125236 A1 | 9/2002 | Moravek et al. | |
| 2003/0230559 A1 | 12/2003 | Briand et al. | |
| 2004/0013951 A1 | 1/2004 | Wang et al. | |
| 2004/0062873 A1 | 4/2004 | Jung et al. | |
| 2006/0162817 A1 | 7/2006 | Boger et al. | |
| 2007/0036994 A1 | 2/2007 | Andre et al. | |
| 2010/0068559 A1 * | 3/2010 | Muthukumaran | B23K 35/362 |
| | | | 148/26 |
| 2010/0173087 A1 | 7/2010 | Call et al. | |
| 2010/0288397 A1 * | 11/2010 | Tseng | B23K 35/34 |
| | | | 148/26 |
| 2011/0008537 A1 | 1/2011 | Leveaux et al. | |
| 2011/0048495 A1 | 3/2011 | Peddada | |
| 2011/0240121 A1 | 10/2011 | Dalal et al. | |
| 2012/0234814 A1 * | 9/2012 | Tseng | B23K 35/362 |
| | | | 219/145.23 |
| 2014/0124482 A1 | 5/2014 | Katiyar | |
| 2014/0313574 A1 | 10/2014 | Bills et al. | |

(Continued)

FOREIGN PATENT DOCUMENTS

| | | |
|---|---|---|
| CA | 2943252 C | 1/2019 |
| CN | 1475325 | 2/2004 |

(Continued)

OTHER PUBLICATIONS

CN-103769773-A (Duan, Can) May 7, 2014 [retrieved on May 22, 2024]. Retrieved from Espacenet Database, translation by EPO and Google. (Year: 2014).*
CN-104259633-A (Li, Xiaobao) Jan. 7, 2015 [retrieved on May 22, 2024]. Retrieved from Espacenet Database, translation by EPO and Google. (Year: 2015).*
CN-103846577-A (Cai, Yanqiu) Jun. 11, 2014 [retrieved on May 22, 2024]. Retrieved from Espacenet Database, translation by EPO and Google. (Year: 2014).*
See Search Report of PCT/IB2020/053582 dated Dec. 5, 2020.
See Search Report of PCT/IB2020/053588 dated Dec. 5, 2020.

(Continued)

*Primary Examiner* — Ibrahime A Abraham
*Assistant Examiner* — Franklin Jefferson Wang
(74) *Attorney, Agent, or Firm* — Davidson Kappel LLC

(57) ABSTRACT

A pre-coated steel substrate wherein the coating including at least one titanate and at least one nanoparticle; a method for the manufacture of an assembly; a method for the manufacture of a coated steel substrate and a coated substrate substrate. It is particularly well suited for construction, shipbuilding and offshore industries.

24 Claims, No Drawings

(56) References Cited

U.S. PATENT DOCUMENTS

| | | |
|---|---|---|
| 2015/0027993 A1 | 1/2015 | Bruck et al. |
| 2015/0115511 A1 | 4/2015 | Lindgren et al. |
| 2017/0101541 A1 | 4/2017 | Roth et al. |
| 2017/0145554 A1 | 5/2017 | Shuster et al. |
| 2017/0173744 A1* | 6/2017 | Tseng ................. B23K 35/3601 |
| 2018/0281064 A1 | 10/2018 | Takahashi et al. |

FOREIGN PATENT DOCUMENTS

| | | | |
|---|---|---|---|
| CN | 1809440 A | 7/2006 | |
| CN | 1978563 A | 6/2007 | |
| CN | 101138815 A | 3/2008 | |
| CN | 101952483 A | 1/2011 | |
| CN | 102862004 A | 1/2013 | |
| CN | 103008845 A | 4/2013 | |
| CN | 103769773 A * | 5/2014 | ......... B23K 35/3607 |
| CN | 103846577 A * | 6/2014 | ......... B23K 35/3602 |
| CN | 104259633 A * | 1/2015 | ........... B23K 33/004 |
| CN | 105033506 A | 11/2015 | |
| CN | 105431254 A | 3/2016 | |
| CN | 106312263 A | 1/2017 | |
| CN | 106883754 A | 6/2017 | |
| CN | 106994548 A | 8/2017 | |
| CN | 109023354 | 12/2018 | |
| CN | 109055685 A | 12/2018 | |
| CN | 109604868 A | 4/2019 | |
| EP | 1980357 A1 | 10/2008 | |
| JP | S56160894 A | 12/1981 | |
| JP | S6120688 A | 1/1986 | |
| JP | S63177987 A | 7/1988 | |
| JP | H03165994 A | 7/1991 | |
| JP | H07118757 A | 5/1995 | |
| JP | H07214369 A | 8/1995 | |
| JP | H07278844 A | 10/1995 | |
| JP | H0885819 A | 4/1996 | |
| JP | 2001262368 A | 9/2001 | |
| JP | 2002120088 | 4/2002 | |
| JP | 2004351498 A | 12/2004 | |
| JP | 2008038188 A | 2/2008 | |
| JP | 2010005696 A | 1/2010 | |
| JP | 2016135905 A | 7/2016 | |
| JP | 2018135585 A | 8/2018 | |
| KR | 1020080061402 | 7/2008 | |
| WO | WO 00/16940 A2 | 3/2000 | |
| WO | WO0059674 A1 | 10/2000 | |
| WO | WO02/081142 | 10/2002 | |
| WO | WO 2007002017 A1 | 1/2007 | |
| WO | WO 2008/056371 A1 | 5/2008 | |
| WO | WO 2020/212885 A1 | 10/2020 | |
| WO | WO 2020/212889 A1 | 10/2020 | |
| WO | WO 2020/212891 A1 | 10/2020 | |

OTHER PUBLICATIONS

See Search Report of PCT/IB2020/053584 dated Nov. 5, 2020.
See Search Report of PCT/IB2020/053591 dated Nov. 5, 2020.
David Bergström, The Absorptance of Metallic Alloys to Nd:YAG and Nd:YLF Laser Light, Licentiate Thesis, Division of Manufacturing Systems Engineering, Department of Applied Physics and Mechanical Engineering, Lulea University of Technology, Lulea, Sweden, Lulea, Nov. 2005; 2005:89.

* cited by examiner

METHOD FOR THE MANUFACTURE OF AN ASSEMBLY BY SUBMERGED ARC WELDING (SAW)

The present invention relates to a pre-coated steel substrate wherein the coating comprises at least one titanate and at least one nanoparticle; a method for the manufacture of an assembly; a method for the manufacture of a coated metallic substrate and finally a coated metallic substrate. It is particularly well suited for construction, shipbuilding and offshore industries.

BACKGROUND

It is known to use steel parts in construction and equipments in the energy sector. The manufacture of steel parts is generally followed by the welding of the steel part with another metallic substrate. Such welding can be a bottleneck in production since the steel substrates are thick. There is not a deep weld penetration and several welding steps are needed to fully weld the steel substrates.

Sometimes, steel parts are welded by Submerged arc welding (SAW) which is a common arc welding process. SAW requires a continuously fed consumable solid or tubular (metal cored) electrode. The molten weld and the arc zone are protected from atmospheric contamination by being "submerged" under a blanket of granular fusible flux. When molten, the flux becomes conductive, and provides a current path between the electrode and the work. SAW is normally operated in the automatic or mechanized mode, however, semi-automatic (hand-held) SAW guns with pressurized or gravity flux feed delivery are available.

The patent application U.S. Pat. No. 3,393,102 discloses a Submerged Arc Welding flux comprising silicon dioxide, manganese dioxide and certain emitter oxides. The emitter oxides are the oxides of calcium, magnesium, aluminum, and titanium. All of the flux ingredients are ground to a fine powder, thoroughly mixed and then bound together into granules of a preferred size to pass through a 16 mesh, corresponding to 1190 µm, and remain on a 100 mesh screen, 100 mesh corresponding to 149 µm.

SUMMARY OF THE INVENTION

Nevertheless, this flux is protecting the arc and, in combination with the consumable wire, reacting with the melt pool to produce the adequate chemical composition and mechanical properties, but no productivity improvement or higher penetration is revealed.

Thus, there is a need to improve the weld penetration in steel substrates and therefore the mechanical properties of a welded steel substrates. There is also a need to obtain an assembly of at least two metallic substrates welded together by SAW welding with an increase in the deposition rate and productivity, said assembly comprising a steel substrate.

The present invention provides a pre-coated steel substrate coated with:
optionally, an anticorrosion coating and
a pre-coating comprising at least one titanate and at least one nanoparticle.

The pre-coated steel substrate according to the invention may also have the optional features listed below, considered individually or in combination:
the pre-coating comprises at least one titanate chosen from among: $Na_2Ti_3O_7$, $K_2TiO_3$, $K_2Ti_2O_5$ $MgTiO_3$, $SrTiO_3$, $BaTiO_3$, and $CaTiO_3$, $FeTiO_3$ and $ZnTiO_4$ or a mixture thereof,
the pre-coating comprises at least one nanoparticle chosen from $TiO_2$, $SiO_2$, Yttria-stabilized zirconia (YSZ), $Al_2O_3$, $MoO_3$, $CrO_3$, $CeO_2$ or a mixture thereof.
the pre-coating further comprises an organic solvent,
the thickness of the coating is between 10 to 140 µm,
the percentage of nanoparticle(s) is below or equal to 80 wt. %,
the percentage of titanate(s) is above or equal to 45 wt. %,
the pre-coated steel substrate comprises a shielding flux,
the anti-corrosion coating layer(s) include a metal selected from among the group comprising zinc, aluminum, copper, silicon, iron, magnesium, titanium, nickel, chromium, manganese and their alloys.
the diameter of the at least one titanate is between 1 and 40 µm.

The invention also relates to a method for the manufacture of the pre-coated metallic substrate according to the invention, comprising the successive following steps:
A. The provision of a steel substrate according to the invention,
B. The deposition of the pre-coating according to the invention,
C. Optionally, the drying of the coated metallic substrate obtained in step B).

The method according to the invention may also have the optional features listed below, considered individually or in combination:
the deposition of the pre-coating is performed by spin coating, spray coating, dip coating or brush coating,
the pre-coating comprises from 1 to 200 g/L of nanoparticle(s),
the pre-coating comprises from 100 to 500 g/L of titanate.

The invention also relates to a method for the manufacture of an assembly comprising the following successive steps:
I. The provision of at least two metallic substrates wherein at least one metallic substrate is the pre-coated steel substrate according to the invention and
II. The welding of at least two metallic substrates by submerged arc welding (SAW) welding.

The method according to the invention may also have the optional features listed below, considered individually or in combination:
the electric current average is between 100 and 1000 A, the voltage is between 1 and 100V.

The invention also relates to an assembly of at least two metallic substrates at least partially welded together through submerged arc welding (SAW) welding obtainable from the method according to the invention, said assembly comprising:
at least one steel substrate coated with optionally an anticorrosion coating and
a welded zone comprising the dissolved and/or precipitated pre-coating comprising at least one titanate and at least one nanoparticle.

The assembly according to the invention may also have the optional features listed below, considered individually or in combination:
the nanoparticle is chosen from among: $TiO_2$, $SiO_2$, Yttria-stabilized zirconia (YSZ), $Al_2O_3$, $MoO_3$, $CrO_3$, $CeO_2$ or a mixture thereof,
the second metallic substrate is a steel substrate or an aluminum substrate,
the second metallic substrate is a pre-coated steel substrate according to the invention.

Finally, the invention relates to the use of an assembly obtainable from the method according to the invention for the manufacture of pressure vessels or offshore components.

DETAILED DESCRIPTION

The following terms are defined:

Nanoparticles are particles between 1 and 100 nanometers (nm) in size.

Titanate refers to inorganic compounds whose composition combines a titanium oxide with at least one other oxide. They can be in the form of their salts.

"coated" means that the steel substrate is at least locally covered with the pre-coating. The covering can be for example limited to the area where the steel substrate will be welded. "coated" inclusively includes "directly on" (no intermediate materials, elements or space disposed therebetween) and "indirectly on" (intermediate materials, elements or space disposed therebetween). For example, coating the steel substrate can include applying the pre-coating directly on the substrate with no intermediate materials/elements therebetween, as well as applying the pre-coating indirectly on the substrate with one or more intermediate materials/elements therebetween (such as an anticorrosion coating).

Without willing to be bound by any theory, it is believed that the pre-coating mainly modifies the melt pool physics of the steel substrate allowing a deeper melt penetration. It seems that, in the present invention, not only the nature of the compounds, but also the size of the particles being equal or below 100 nm improve the penetration thanks to the keyhole effect, arc constriction, the reverse Marangoni effect and an improvement of arc stability.

Indeed, the titanate mixed with nanoparticles allows for a keyhole effect due to the combined effects of the reverse Marangoni flow and of the constriction of the arc by electrical insulation, resulting in higher current density and an increase in weld penetration. The keyhole effect refers to a literal hole, a depression in the surface of the melt pool, which allows the energy beam to penetrate even more deeply resulting in a deeper penetration and an increase in the deposition rate. Energy is delivered very efficiently into the joint, which maximizes weld depth to width ratio, which in turn limits part distortion.

Moreover, the pre-coating modifies the Marangoni flow, which is the mass transfer at the liquid-gas interface due to the surface tension gradient. In particular, the components of the pre-coating modify the gradient of surface tension along the interface. This modification of surface tension results in an inversion of the fluid flow towards the center of the weld pool which in this case results in improvements in the weld penetration, in the wettability and in the material deposition rate leading to an increase in productivity. Without willing to be bound by any theory, it is believed that the nanoparticles dissolve at lower temperature than microparticles and therefore more oxygen is dissolved in the melt pool, which activate the reverse Marangoni flow.

Additionally, it has been observed that the nanoparticles improve the homogeneity of the applied pre-coating by filling the gaps between the microparticles. It helps stabilizing the welding arc, thus improving the weld penetration and quality.

Preferably, the pre-coating comprises at least one nanoparticle chosen from $TiO_2$, $SiO_2$, Yttria-stabilized zirconia (YSZ), $Al_2O_3$, $MoO_3$, $CrO_3$, $CeO_2$ or a mixture thereof. Indeed, without willing to be bound by any theory, it is believed that these nanoparticles further modify the melt pool physics allowing a deeper weld penetration. Moreover, without willing to be bound by any theory, it is believed that the diameter of the nanoparticles further improves the homogeneous distribution of the coating.

Preferably, the nanoparticles are $SiO_2$ and $TiO_2$, and more preferably a mixture of $SiO_2$ and $TiO_2$. Without willing to be bound by any theory, it is believed that $SiO_2$ mainly helps in increasing the penetration depth and the slag removal and detaching while $TiO_2$ mainly helps in increasing the penetration depth and alloying with steel to form Ti-based inclusions which improve the mechanical properties.

Preferably, the nanoparticles have a size comprised between 5 and 60 nm.

Preferably, the percentage in dry weight of the nanoparticles is below or equal to 80% and preferably between 2 and 40%. In some cases, the percentage of nanoparticles may have to be limited to avoid a too high refractory effect. The person skilled in the art who knows the refractory effect of each kind of nanoparticles will adapt the percentage case by case.

The nanoparticles are not selected among sulfides or halides which are detrimental for carbon steels.

Preferably, the titanate has a diameter between 1 and 40 μm, more preferably between 1 and 20 μm and advantageously between 1 and 10 μm. Indeed, without willing to be bound by any theory, it is believed that this titanate diameter further improves the keyhole effect, the arc constriction and the reverse Marangoni effect.

Preferably, the pre-coating comprises at least one kind of titanate chosen from among: $Na_2Ti_3O_7$, $NaTiO_3$, $K_2TiO_3$, $K_2Ti_2O_5$ $MgTiO_3$, $SrTiO_3$, $BaTiO_3$, and $CaTiO_3$, $FeTiO_3$ and $ZnTiO_4$ or a mixture thereof. Indeed, without willing to be bound by any theory, it is believed that these titanates further increase the penetration depth based on the effect of the reverse Marangoni flow.

Preferably, the percentage in dry weight of the at least one titanate is above or equal to 45% and for example of 50 or of 70%.

According to one variant of the invention, once the pre-coating is applied on the steel substrate and dried, it consists of at least one titanate and at least one nanoparticle.

According to another variant of the invention, the coating further comprises at least one binder embedding the titanate and the nanoparticles and improving the adhesion of the pre-coating on the steel substrate. Preferably, the binder is purely inorganic, notably to avoid fumes that an organic binder could possibly generate during welding. Examples of inorganic binders are sol-gels of organofunctional silanes or siloxanes. Examples of organofunctional silanes are silanes functionalized with groups notably of the families of amines, diamines, alkyls, amino-alkyls, aryls, epoxys, methacryls, fluoroalkyls, alkoxys, vinyls, mercaptos and aryls. Amino-alkyl silanes are particularly preferred as they are greatly promoting the adhesion and have a long shelf life. Preferably, the binder is added in an amount of 1 to 20 wt % of the dried pre-coating.

Preferably the thickness of the coating is between 10 to 140 μm, more preferably between 30 to 100 μm.

Preferably, the steel substrate is carbon steel.

Preferably, the anti-corrosion coating includes a metal selected from the group consisting of zinc, aluminum, copper, silicon, iron, magnesium, titanium, nickel, chromium, manganese and their alloys.

In a preferred embodiment, the anti-corrosion coating is an aluminum-based coating comprising less than 15% Si, less than 5.0% Fe, optionally 0.1 to 8.0% Mg and optionally 0.1 to 30.0% Zn, the remainder being Al. In another preferred embodiment, the anti-corrosion coating is a zinc-based coating comprising 0.01-8.0% Al, optionally 0.2-8.0% Mg, the remainder being Zn.

The anti-corrosion coating is preferably applied on at least one side of the steel substrate.

Preferably, the pre-coated steel substrate is at least locally covered by a shielding flux. It seems that this flux protects the steel substrate against oxidation during the welding process.

The invention also relates to a method for the manufacture of the pre-coated metallic substrate, comprising the successive following steps:

A. The provision of a steel substrate according to the present invention,
B. The deposition of the pre-coating according to the present invention,
C. Optionally, the drying of the coated metallic substrate obtained in step B).

Preferably, in step A), the steel substrate is carbon steel.

Preferably, in step B), the deposition of the pre-coating is performed by spin coating, spray coating, dip coating or brush coating.

Preferably, in step B), the pre-coating is deposited locally only. In particular, the pre-coating is applied in the area where the steel substrate will be welded. It can be on the edge of the steel substrate to be welded or on one part of one side of the substrate to be welded. More preferably, the width of the applied pre-coating is at least as large as the weld to be done so that the arc constriction is further improved.

Advantageously, the pre-coating further comprises an organic solvent. Indeed, without willing to be bound by any theory, it is believed that the organic solvent allows for a well dispersed pre-coating. Preferably, the organic solvent is volatile at ambient temperature. For example, the organic solvent is chosen from among: volatile organic solvents such as acetone, methanol, isopropanol, ethanol, ethyl acetate, diethyl ether, non-volatile organic solvents such as ethylene glycol and water.

Advantageously, in step B), the pre-coating comprises from 1 to 200 g/L of nanoparticles, more preferably between 5 and 80 $g \cdot L^{-1}$.

Preferably, in step B), the pre-coating comprises from 100 to 500 g/L of titanate, more preferably between 175 and 250 $g \cdot L^{-1}$.

According to another variant of the invention, the pre-coating of step B) further comprises a binder precursor to embed the titanate and the nanoparticles and to improve the adhesion of the pre-coating on the steel substrate. Preferably, the binder precursor is a sol of at least one organofunctional silane. Examples of organofunctional silanes are silanes functionalized with groups notably of the families of amines, diamines, alkyls, amino-alkyls, aryls, epoxys, methacryls, fluoroalkyls, alkoxys, vinyls, mercaptos and aryls. Preferably, the binder precursor is added in an amount of 40 to 400 g·L–1 of the pre-coating.

When a drying step C) is performed, the drying is performed by blowing air or inert gases at ambient or hot temperature. When the pre-coating comprises a binder, the drying step C) is preferably also a curing step during which the binder is cured. The curing can be performed by Infra-Red (IR), Near Infra-Red (NIR), conventional oven.

Preferably, the drying step C) is not performed when the organic solvent is volatile at ambient temperature. Indeed, it is believed that after the deposition of the coating, the organic solvent evaporates leading to a dried pre-coating on the metallic substrate.

The invention also relates to a method for the manufacture of an assembly comprising the following successive steps:

I. The provision of at least two metallic substrates wherein at least one metallic substrate is the pre-coated steel substrate according to the present invention and
II. The welding of the at least two metallic substrates by submerged arc welding (SAW) welding.

Preferably, in step II), the electric current average is between 1 and 1000 A.

Preferably, in step II), the voltage of the welding machine is between 1 and 100V.

Preferably, in step II), there is a consumable electrode (so-called wire). For example, the consumable electrode is made of Fe, Si, C, Mn, Mo and/or Ni.

Preferably, in step II), the metallic substrates are at least locally covered by a shielding flux.

With the method according to the present invention, it is possible to obtain an assembly of at least a first metallic substrate in the form of a steel substrate optionally coated with an anticorrosion coating and a second metallic substrate, the first and second metallic substrates being at least partially welded together through submerged arc welding (SAW) welding wherein the welded zone comprises a dissolved and/or precipitated pre-coating comprising at least one titanate and at least one nanoparticle.

Preferably, the nanoparticle is chosen from among: $TiO_2$, $SiO_2$, Yttria-stabilized zirconia (YSZ), $Al_2O_3$, $MoO_3$, $CrO_3$, $CeO_2$ or a mixture thereof.

By "dissolved and/or precipitated flux", it is meant that components of the pre-coating can be dragged towards the center of the liquid-gas interface of the melt pool because of the reverse Marangoni flow and can be even dragged inside the molten metal. Some components dissolve in the melt pool which leads to an enrichment in the corresponding elements in the weld. Other components precipitate and are part of the complex oxides forming inclusions in the weld.

In particular, when the Al amount of the steel substrate is above 50 ppm, the welded zone comprises inclusions comprising notably Al—Ti oxides or Si—Al—Ti oxides or other oxides depending on the nature of the added nanoparticles. These inclusions of mixed elements are smaller than 5 µm. Consequently, they do not compromise the toughness of the welded zone. The inclusions can be observed by Electron Probe Micro-Analysis (EPMA). Without willing to be bound by any theory, it is believed that the nanoparticles promote the formation of inclusions of limited size so that the toughness of the welded zone is not compromised.

Preferably, the second metallic substrate is a steel substrate or an aluminum substrate. More preferably, the second steel substrate is a pre-coated steel substrate according to the present invention.

Finally, the invention relates to the use of an assembly according to the present invention for the manufacture of pressure vessels, offshore components.

EXAMPLES

The following examples and tests are non-restricting in nature and must be considered for purposes of illustration only. They will illustrate the advantageous features of the present invention, the significance of the parameters chosen by the inventors after extensive experiments and further establish the properties that can be achieved by the invention.

For the Trials, the steel substrate having the chemical composition in weight percent disclosed in Table 1 was used:

| C | Mn | Si | Al | S | P | Cu | Ni | Cr |
|---|---|---|---|---|---|---|---|---|
| 0.161 | 1.459 | 0.368 | 0.031 | 0.0011 | 0.012 | 0.017 | 0.02 | 0.03 |

| Nb | Mo | V | Ti | B | N | Fe |
|---|---|---|---|---|---|---|
| 0.0012 | 0.0033 | 0.0027 | 0.0009 | 0.0001 | 0.0035 | Balance |

The steel substrate was 20 mm thick.

Example 1

Trial 1 was not coated with a pre-coating.

For Trial 2, an acetone solution comprising $MgTiO_3$ (diameter: 2 μm), $SiO_2$ (diameter: 10 nm) and $TiO_2$ (diameter: 50 nm) was prepared by mixing acetone with said elements. In the acetone solution, the concentration of $MgTiO_3$ was of 175 g·L$^{-1}$. The concentration of $SiO_2$ was of 25 g·L$^{-1}$. The concentration of $TiO_2$ was of 50 g·L$^{-1}$. Then, Trial 2 was coated with the acetone solution by spraying. The acetone evaporated. The percentage of $MgTiO_3$ in the coating was of 70 wt. %, the percentage of $SiO_2$ was of 10 wt. % and the percentage of $TiO_2$ was of 20 wt. %. The coating thickness was of 40 μm.

Trials 1 and 2 were then coated with a shielding flux in the form of an agglomerated basic mild steel low alloy. Finally, Trial 1 and 2 were joined with a steel substrate having the above composition by SAW welding. The welding parameters are in the following Table 2:

| Electric current (A) | Speed (cm.min$^{-1}$) | Voltage (V) | Diameter electrode negative (mm) |
|---|---|---|---|
| 610-660 | 2800 | 25 | 3.25 mm |

The composition of the consumable electrode used in both Trials 1 and 2 is in the following Table 3:

| C | Si | Mn | P | S | Cr | Ni | Mo | Ti | B | Fe |
|---|---|---|---|---|---|---|---|---|---|---|
| 0.07 | 0.28 | 1.23 | 0.010 | 0.003 | 0.03 | 0.02 | 0.01 | 0.15 | 0.012 | balance |

After the SAW welding, the steel microstructure was analyzed by Scanning Electron Microscopy (SEM). Trials were bended until 180° according to the norm ISO 15614-7. The hardness of both Trials was determined in the center of the welded area using a microhardness tester. The composition of the welded area was analyzed by Energy Dispersive X-ray Spectroscopy and inductively coupled plasma emission spectroscopy (ICP-OES). The residual stress of the welded area was determined by simulations. Results are in the following Table 4:

| Trials | Coating thickness (μm) | Steel microstructure by SEM | Residual stress by simulation | Material deposition (number passes) | Bending 180° | Hardness in the welded area (HV) | Composition of welded area by XRC |
|---|---|---|---|---|---|---|---|
| 1 | — | no formation of brittle phases (martensite + ferrite) | important area of stress around the welded area | 9 welding passes | No cracks | 350 | Mn—S inclusions |
| 2* | 40 | no formation of brittle phases (martensite + ferrite) | almost no stress | 3 welding passes. Increase in productivity: 300% | No cracks | 325 | Al—Si—Mn—S and Al—Ti—Si—Mn—S Well dispersed |

*according to the present invention

Results show that Trial 2 improves the SAW welding compared to comparative Trial 1.

Example 2

Different pre-coatings were tested by Finite Element Method (FEM) simulations on the steel substrates. In the simulations, the pre-coating comprises $MgTiO_3$ (diameter: 2 μm) and nanoparticles having a diameter of 10-50 nm. The thickness of the coating was of 40 μm. Arc welding was simulated with each pre-coating. Results of the arc welding simulations are in the following Table 5:

| Trials | Coating composition (wt. %) | | | Results |
|---|---|---|---|---|
| 6* | 50% $MgTiO_3$ | 40% $TiO_2$ | 10% YSZ | Homogeneous thermal profile. No formation of brittle phases. Maximum temperature in the middle of the steel. Full penetration |
| 7* | 50% $MgTiO_3$ | 15% $TiO_2$ | 35% $Al_2O_3$ | Homogeneous thermal profile. No formation of brittle phases. Maximum temperature in the middle of the steel. Full penetration |
| 8* | 50% $MgTiO_3$ | 15% $TiO_2$ | 35% $MoO_3$ | Homogeneous thermal profile. No formation of brittle phases. Maximum temperature in the middle of the steel. Full penetration |
| 9* | 50% $MgTiO_3$ | 15% $TiO_2$ | 35% $CrO_3$ | Homogeneous thermal profile. No formation of brittle phases. Maximum temperature in the middle of the steel. Full penetration |
| 10* | 50% $MgTiO_3$ | 15% $TiO_2$ | 35% $CeO_2$ | Homogeneous thermal profile. No formation of brittle phases. Maximum temperature in the middle of the steel. Full penetration |
| 11* | 70% $MgTiO_3$ | 10% $SiO_2$ | 20% $CeO_2$ | Homogeneous thermal profile. No formation of brittle phases. Maximum temperature in the middle of the steel. Full penetration |

Results show that Trials according to the present invention improve the arc welding.

Example 3

For trial 12, a water solution comprising the following components was prepared: 363 g·L$^{-1}$ of $MgTiO_3$ (diameter: 2 μm), 77.8 g·L$^{-1}$ of $SiO_2$ (diameter range: 12-23 nm), 77.8 g·L$^{-1}$ of $TiO_2$ (diameter range: 36-55 nm) and 238 g·L$^{-1}$ of 3-aminopropyltriethoxysilane (Dynasylan® AMEO produced by Evonik®). The solution was applied on the steel substrate and dried by 1) IR and 2) NIR. The dried coating was 40 μm thick and contained 62 wt % of $MgTiO_3$, 13 wt % of $SiO_2$, 13 wt % of $TiO_2$ and 12 wt % of the binder obtained from 3-aminopropyltriethoxysilane.

For trial 13, a water solution comprising the following components was prepared: 330 g·L$^{-1}$ of $MgTiO_3$ (diameter: 2 μm), 70.8 g·L$^{-1}$ of $SiO_2$ (diameter range: 12-23 nm), 70.8 g·L$^{-1}$ of $TiO_2$ (diameter range: 36-55 nm), 216 g·L$^{-1}$ of 3-aminopropyltriethoxysilane (Dynasylan® AMEO produced by Evonik®) and 104.5 g·L$^{-1}$ of a composition of organofunctional silanes and functionalized nanoscale $SiO_2$ particles (Dynasylan® Sivo 110 produced by Evonik). The solution was applied on the steel substrate and dried by 1) IR and 2) NIR. The dried coating was 40 μm thick and contained 59.5 wt % of $MgTiO_3$, 13.46 wt % of $SiO_2$, 12.8 wt % of $TiO_2$ and 14.24 wt % of the binder obtained from 3-aminopropyltriethoxysilane and the organofunctional silanes.

In all cases, the adhesion of the pre-coating on the steel substrate was greatly improved.

What is claimed is:

1. A pre-coated steel substrate comprising:
   a steel substrate; and
   a pre-coating coating the steel substrate, the precoating including at least one titanate having a diameter between 1 and 40 μm and at least one nanoparticle, wherein the at least one nanoparticle is selected from the group consisting of: $TiO_2$, $SiO_2$, Yttria-stabilized zirconia (YSZ), $Al_2O_3$, $MoO_3$, $CrO_3$, $CeO_2$ and mixtures thereof, the coated steel substrate further including a shielding flux.

2. The pre-coated steel substrate as recited in claim 1 wherein
   the at least one titanate is selected from the group consisting of: $Na_2Ti_3O_7$, $NaTiO_3$, $K_2TiO_3$, $K_2Ti_2O_5$ $MgTiO_3$, $SrTiO_3$, $BaTiO_3$, and $CaTiO_3$, $FeTiO_3$, $ZnTiO_4$ and mixtures thereof.

3. The pre-coated steel substrate as recited in claim 1 wherein
   a thickness of the pre-coating is between 10 to 140 μm.

4. The pre-coated steel substrate as recited in claim 1 wherein
   a percentage of the at least one nanoparticle is below or equal to 80wt. %.

5. The pre-coated steel substrate as recited in claim 1 wherein
   a percentage of the at least one titanate is above or equal to 45wt. %.

6. The pre-coated steel substrate as recited in claim 1 wherein
   the pre-coating further includes a binder.

7. The pre-coated steel substrate as recited in claim 6 wherein
   a percentage of the binder in the pre-coating is between 1 and 20 wt. %.

8. The pre-coated steel substrate as recited in claim 1 further
   comprising an anticorrosion coating.

9. The pre-coated steel substrate as recited in claim 8 wherein
   the anti-corrosion coating includes a metal selected from the group consisting of zinc, aluminum, copper, silicon, iron, magnesium, titanium, nickel, chromium, manganese and their alloys.

10. A method for the manufacture of the pre-coated steel substrate as recited in claim 1, comprising the successive following steps:
    A. providing the steel substrate;
    B. depositing the pre-coating; and
    C. depositing the shielding flux on the precoated substrate.

11. The method as recited in claim 10 further comprising drying the coated steel substrate obtained in step B.

12. The method as recited in claim 10 wherein in step B, the deposition of the pre-coating is performed by spin coating, spray coating, dip coating or brush coating.

13. The method as recited in claim 10 wherein in step B, the pre-coating further includes an organic solvent.

14. The method as recited in claim 10 wherein in step B, the pre-coating includes from 1 to 200 g/L of the at least one nanoparticle.

15. The method as recited in claim 10 wherein in step B, the pre-coating includes from 100 to 500 g/L of the at least one titanate.

16. The method as recited in claim 10 wherein the shielding flux further includes a binder precursor.

17. A method for manufacture of an assembly comprising the following successive steps:
provilding at least two metallic substrates wherein a first of the at least two metallic substrates is a pre-coated steel coated with a precoating according to claim 1; and
welding of the at least two metallic substrates by SAW welding.

18. The method as recited in claim 17 wherein an electric current average of the welding is between 100 and 1000A.

19. The method as recited in claim 17 wherein a voltage of the welding is between 1 and 100V.

20. An assembly of at least a first metallic substrate in the form of the pre-coated steel substrate as recited in claim 1 and a second metallic substrate, the first and second metallic substrates being at least partially welded together through SAW welding, wherein the welded zone includes the pre-coating as a dissolved or precipitated pre-coating.

21. The assembly as recited in claim 20 wherein the second metallic substrate is a steel substrate or an aluminum substrate.

22. The assembly as recited in claim 20 wherein the second metallic substrate includes a second steel substrate; and a second pre-coating coating the second steel substrate and including at least one titanate and at least one nanoparticle.

23. A method of manufacturing pressure vessels or offshore components comprising employing the assembly as recited in claim 20.

24. The pre-coated steel substrate as recited in claim 1, wherein the steel substrate is carbon steel.

* * * * *